United States Patent [19]
Ogishi et al.
[11] 4,092,575
[45] May 30, 1978

[54] APPARATUS FOR AUTOMATICALLY CONTROLLING THE OPERATION OF AUTOMATIC DOOR

[75] Inventors: Masaaki Ogishi, Kurobe; Akira Azuma, Uozu, both of Japan

[73] Assignee: Yoshida Kogyo K.K., Tokyo, Japan

[21] Appl. No.: 718,820

[22] Filed: Aug. 30, 1976

[30] Foreign Application Priority Data

| | | |
|---|---|---|
| Sep. 8, 1975 | Japan | 50-108683 |
| Sep. 8, 1975 | Japan | 50-108684 |
| Sep. 8, 1975 | Japan | 50-108685 |

[51] Int. Cl.² .................... G05D 3/00
[52] U.S. Cl. .................... 318/282; 318/286
[58] Field of Search .................... 318/282, 286

[56] References Cited

U.S. PATENT DOCUMENTS

| | | | |
|---|---|---|---|
| 3,039,764 | 6/1962 | Heinsman et al. | 318/282 X |
| 3,180,635 | 4/1965 | Miller | 318/286 |
| 3,886,425 | 5/1975 | Weiss | 318/282 X |
| 3,891,909 | 6/1975 | Newson | 318/282 X |

*Primary Examiner*—Robert K. Schaefer
*Assistant Examiner*—W. E. Duncanson, Jr.
*Attorney, Agent, or Firm*—Hill, Gross, Simpson, Van Santen, Steadman, Chiara & Simpson

[57] ABSTRACT

Apparatus for automatically controlling the operation of a reciprocable door between its closed and opened positions. A position sensing means is provided for sensing the position of the door during its opening and closing strokes to decelerate the speed of the door at a final portion of the door stroke, thereby preventing the door from striking an outer door frame.

14 Claims, 13 Drawing Figures

APPARATUS FOR AUTOMATICALLY CONTROLLING THE OPERATION OF AUTOMATIC DOOR

BACKGROUND OF THE INVENTION

1. Field of the Invention

This invention relates generally to an automatic door assembly and more particularly to apparatus for automatically controlling the operation of the automatic door.

2. Prior Art

One of the primary difficulties encountered in automatically controlling the operation of an automatic door has been the problem of preventing the door from striking an outer door frame at the end of the door stroke. It has been proposed in the art to decelerate the speed of the door at a final portion of the door stroke to stop the door exactly at the end of its stroke without substantial impact. Most of the prior art apparatus under consideration have employed limit switches for sensing the position of the door at the final portion of the door stroke to effect deceleration of the door, the limit switches being usually mounted on the outer door frame and positioned along the path of the door so that the limit-switches are actuated upon engagement with actuator means attached to the inner door frame within which a glass pane is supported. These conventional position sensing means have been found not entirely satisfactory, however, in that considerable effort is required in alignment and adjustment of the limit switches. Another disadvantage of such prior art position sensing means is that they require frequent attention and readjustment to maintain accurate operation. This difficulty arises out of the fact that the limit switches mounted on the outer door frame depend for their operation upon mechanical engagement with the actuator means.

SUMMARY OF THE INVENTION

It is therefore an object of this invention to provide apparatus for automatically controlling the operation of a reciprocable door which apparatus is reliable in operation and less costly in maintenance.

Another object is to provide means for sensing the position of a reciprocable door which means is durable in construction and ensures accurate operation and inexpensive maintenance of the apparatus.

According to the invention, a motor drive circuit for an automatic door is provided a control driven by the speed reducer of the motor, the control being synchronized in its travel with door movement. To that end, a pair of magnetic reed switches are spaced apart by an angular distance analogous to the door travel, there being a permanent magnet for each switch having a magnetic field that holds the switch in an actuated position. A pair of angularly movable sectors, one coordinated with the end of door-opening movement and the other coordinated with the end of door-closing movement are driven by the speed reducer to respectively pass between said switches and said magnets in which position they short-circuit the magnetic field of the respective magnets to cause each switch to move to its other position. The switches regulate the motor drive circuit to dampen the speed of the motor at the ends of door travel. A timer initiates reverse motor direction for closing the door after a predetermined interval following when the last person passed therethrough. Another timer shuts off the motor after it has operated for a predetermined period of time at reduced speed which corresponds to the arrival of the door in its fully opened or fully closed positions.

Many other advantages and features of the present invention will become manifest to those versed in the art upon making reference to the detailed description and the accompanying sheets of drawings in which preferred structural embodiments incorporating the principles of the present invention are shown by way of example.

DETAILED DESCRIPTION OF THE PREFERRED EMBODIMENTS

Figure 1:
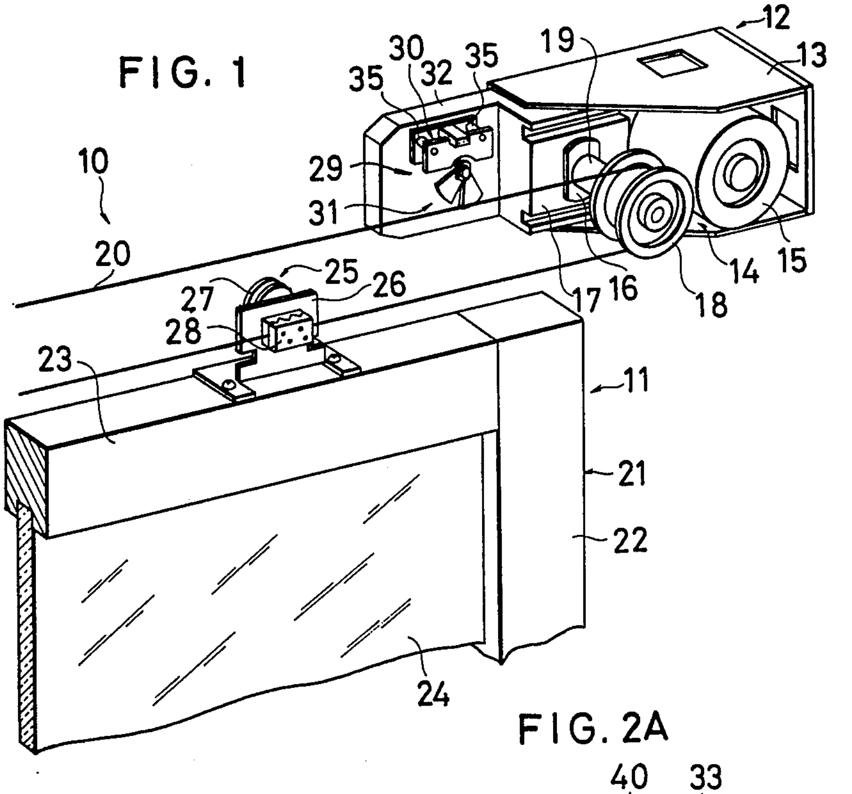
FIG. 1 is a perspective view of a portion of an automatic door assembly incorporating apparatus for controlling the operation of the door, showing a position sensing device according to the invention.

As shown in FIG. 1, an automatic door assembly 10 generally comprises an overhung door 11 which is horizontally reciprocable within an outer door frame (not shown) mounted in a portal in a building in order to open and close the portal, the door frame including a pair of opposed vertical side jambs and a horizontal transom extending between the jambs.

The automatic door assembly 10 also comprises a drive assembly 12 mounted on one of the side jambs, a driven assembly (not shown) mounted on the other side jamb, and an overhead track assembly (not shown) supported between the drive and driven assemblies. As shown in FIG. 1, the drive assembly 12 includes a mounting means or housing 13 fixedly mounted to said one side jamb by bolts or like fasteners. The drive assembly 12 also includes a drive mechanism 14 for driving the door 11 within the outer door frame, the drive mechanism 14 comprising a reversible electric motor 15 and a speed reducer 16 which is contained in a housing 17 secured to the mounting means 13. The drive shaft of the motor 15 is coupled in driving relationship to the speed reducer 16, and a drive pulley 18 is mounted on the output shaft 19 of the speed reducer 16. The driven assembly includes an idler pulley, and an endless wire rope 20 or the like extends around the drive and idler pulleys.

The door 11 has an inner frame 21 comprising of a pair of stiles 22, only one of which is shown in the drawings (FIG. 1), a top rail 23, and a bottom rail (not shown) joined together at their ends to define a rectangular opening within which a glass pane 24 is supported.

At least two roller assemblies 25, only one of which is shown in the drawings (FIG. 1), are provided for suspending the door 11 from a horizontally extending rail of the track assembly, each of the roller assemblies comprising a hanger member or bracket 26 fixedly secured to the upper surface of the top rail 23, and a roller 27 rotatably supported by the bracket 26 for rolling engagement with the track rail. Each of the brackets 26 also includes means 28 for securing the roller assembly 25 to the bottom flight of the wire rope 20.

According to the invention, a position sensing device 29 is provided for sensing the deceleration positions of the moving door 11, the position sensing device constituting part of a control system (FIG, 10) which functions to automatically decelerate the speed of the door during a final portion of the door stroke and to stop the door exactly at the end of the door stroke. The position sensing device 29 comprises a signal generating unit 30 and an actuator unit 31 both of which are attached to a mounting portion 32 extending from the speed reducer housing 17.

Figure 4:
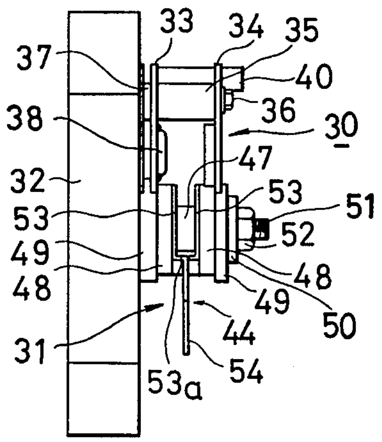
FIG. 4 is a side elevational view of the position sensing device.

As best shown in FIG. 4, the signal generating unit 30 comprises a first plate member 33 made of an electrically insulating material, and a second plate member 34 made of a nonmagnetic material, the first and second plate members 33 and 34 being rectangular and of the same size, and being held in parallel, spaced, registered relationship by a pair of spacer members 35. As shown in FIG. 4, the signal generating unit 30 is secured to the mounting portion 32 by a pair of screws 36 each passing through the second plate member 34, the spacer member 35 and the first plate member 33 into the mounting portion 32. Another spacer member 37 is also interposed between the mounting portion 32 and the first plate member 33.

Figure 2A:
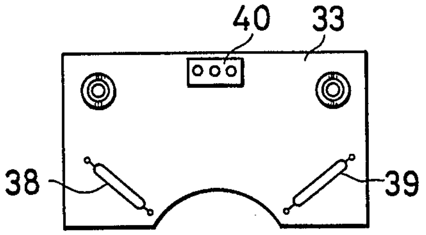
FIGS. 2A, 2B and 2C are front and rear elevational views of a first plate member of the position sensing device.
Figure 2B:
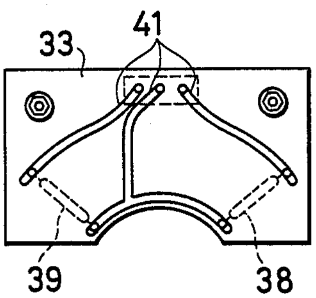

A pair of magnetic reed switches 38, 39 and a connector 40 with three terminals are mounted on the surface of the first plate member 33 facing away from the mounting portion 32, and a conductor pattern 41 (FIG. 2B) is printed on the opposite surface of the first plate member 33 to form a printed circuit through which the reed switches 38,39 are connected to a motor drive circuit 42 (FIG. 10) containing a power source. The reed switches 38,39 may be either of the normally open or normally closed type, depending upon the circuitry used in the motor driven circuit 42.

A pair of permanent magnets 43*a*,43*b* in the form of a bar are mounted on one surface of the second plate member 34 in opposed relationship to the reed switches 38,39, the magnets 43*a*,43*b* being of substantially the same length as the reed switches 38,39 and being disposed exactly in registry with the respective reed switches 38,39 to provide the magnetic field required for relay operation of the reed switches 38,39.

Figure 5:
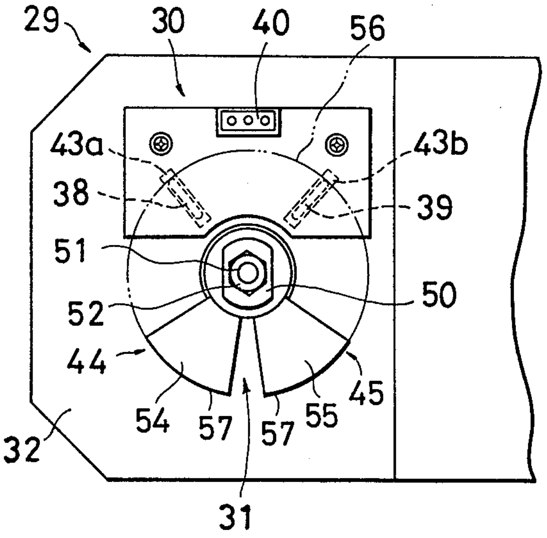
FIG. 5 is a front elevational view of the position sensing device.

As shown in FIGS. 4 and 5, the actuator unit 31 comprises a pair of magnetic shield members 44,45, a spacer member 47 interposed between the magnetic shield members 44,45, a pair of retainer plates 48,48 between which the magnetic shield members 44,45 are sandwiched, a pair of plate members 49,49, one disposed between the mounting portion 32 and the retainer plate 48 and the other between the other retainer plate 48 and a washer 50, and a drive shaft 51 extending from the mounting portion 32 through these component parts and having an engaging portion at its free end mating with a nut 52 hold the parts adjustably together, the drive shaft 51 extending in parallel relationship to the axis of the output shaft 19 of the speed reducer 16 and extending perpendicularly to the planes of the first and second plate members 33,34. The drive shaft 51 is coupled to the output shaft 19 of the speed reducer 16 and is reduced in rotational speed through the intermediary of a gear mechanism (not shown) coupled therebetween.

Each of the magnetic shield members 44,45 is made of a sheet of a high-permeability magnetic material such as iron, and includes a base 53 in the form of a disc through which the drive shaft 51 passes, and a sector 54,55 disposed in parallel, offset relationship to the base 53, and a connecting portion 53*a* interconnecting the base 53 and the sector 54,55. As shown in FIG. 4, the bases 53 are held by the spacer member 47 in parallel spaced relationship to each other, and the sectors 54,55 of identical configuration are so offset from their respective bases 53 toward each other as to lie in a common plane extending intermediate the planes of the bases 53 and parallel to the planes of the first and second plate members 33,34.

The magnetic shield members 44,45 are fixedly mounted by means of the nut 52 on the drive shaft 51 for rotation therewithout about the axis thereof. The sectors 54,55 are spaced apart from each other, and this spacing is to be determined according to the length of travel of the door 11 between its closed and opened positions within the outer door frame. The sectors 54,55 are rotatable in a plane intermediate the first and second plate members 33,34 so that during the door opening or closing travel each sector 54,55 passes between their respective reed switch 38,39 and magnets 43*a*, 43*b* to shield or short-circuit the magnetic field produced by the latter whereupon the reed switches 38,39 are magnetically deactivated for purposes hereinafter more fully described.

The reed switches 38,39 are disposed within a circle 56 which is indicated by a dot-and-dash line in FIG. 5 and is generated by arcuate edges or arcs 57,57 of the sectors 54,55 when the latter rotate between their first and second positions (FIGS. 6 and 7), the circle 56 having its center at a point which lies on the axis of the drive shaft 51. The reed switches 38,39 are angularly spaced equidistantly from a vertical central plane perpendicular to and centrally of the length of the first and second plate members 33,34, a longitudinal axis of each of the reed switches passing through the centerline of the circle 56. The angular positions of the reed switches 38,39 and hence the magnets 43*a*,43*b* disposed in registry therewith determine the length of deceleration travel of the door 11.

When the door 11 is in its fully closed position, the sectors 54,55 are maintained in their respective first or fully clockwise-rotated positions (FIG. 6) with one edge 58 of the sector 54 disposed in the aforesaid vertical central plane. Similarly, when the door 11 is in its fully opened position, the sectors 54,55 are maintained in their respective second or fully counterclockwise-rotated positions (FIG. 7) with one edge 59 of the sector 55 disposed in the aforesaid vertical central plane. The rotation of the sectors 54,55 between their first and second positions corresponds exactly with the door stroke between its closed and opened positions.

There are provided two timer switches 60,61 (FIG. 10) operatively associated with the motor driving circuit 42. The second timer switch 61 is connected to the reed switches 39,38 and operates when the reed switches 39,38 are magnetically deactivated, respectively, (i.e. the magnetic field is short-circuited by the sectors) upon intrusion of the sectors 55,54 between their respective reed switches 39,38 and magnets 43*b*, 43*a* at the final portion of the door opening and closing strokes. The second timer switch 61 serves to determine a timer interval after which the motor 15 is de-energized to stop the door 11 exactly at the end of its opening or closing stroke. The first timer switch 60 serves to determine a time interval after which the motor is again powered to drive the same in a reverse direction to cause the door 11 to start its closing movement.

Figure 6:
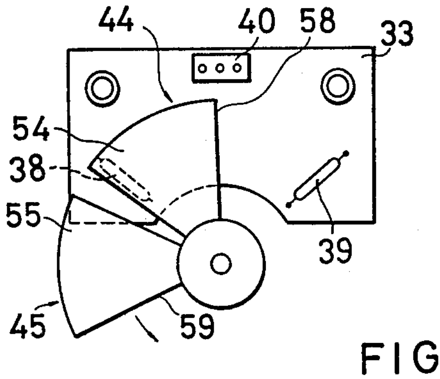
FIG. 6 is a front elevational view of the first plate member with magnetic shield members in their first positions.
Figure 7:
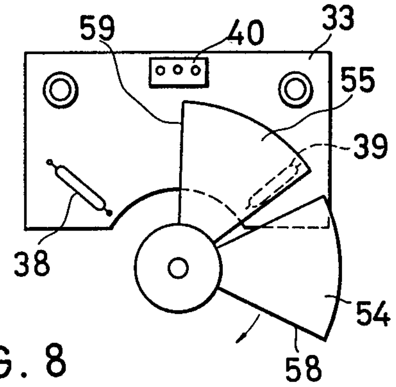
FIG. 7 is a view similar to FIG. 6 but showing the magnetic shield members in their second positions.
Figure 10:
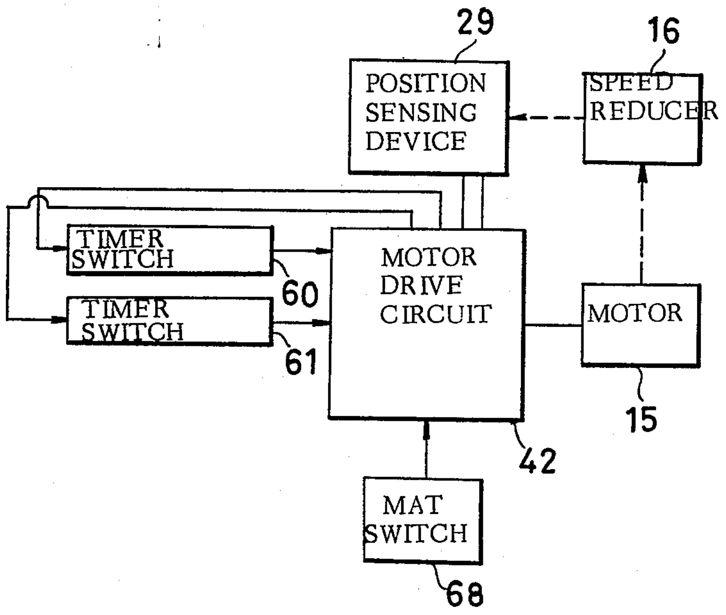
FIG. 10 is a block diagram of a control system as used in conjunction with the automatic door assembly.

A mode of operation of the automatic door assembly 10 is described with reference to a block diagram of the control system shown in FIG. 10. When a person steps on a door mat, a pressure-sensitive switch 68 under the mat is actuated to feed a driving signal to the motor drive circuit 42 whereupon the motor 15 drives the door in its opening direction. The door 11 starts opening, that is, moving in a right-hand direction (FIG. 1), and simultaneously the magnetic shield members 44,45 start rotating in a counterclockwise direction (FIG. 6). Upon intrusion of the sector 55 between the reed switch 39 and the magnet 43*b*, the reed switch 39 is magnetically deactivated to signal the motor drive circuit 42 to control the motor 15 such that the motor 15 is decelerated to drive the door 11 at a lower speed until the door reaches the end of its opening stroke. A signal is also fed simultaneously to the second timer switch 61 to de-energize the motor 15, thereby stopping the door 11 exactly at the end of its opening stroke. The first timer switch 60 is actuated to again drive the motor in a reverse direction a prescribed length of time after the person has stepped off the door mat switch 68, thereby moving the door 11 in its closing direction. When the sector 54 intrudes between the reed switch 38 and the magnet 43*a*, the reed switch 38 is magnetically deactivated to signal the motor drive circuit 42 to control the motor 15 such that the motor 15 is decelerated to drive the door 11 at a lower speed until the door reaches the end of its closing stroke. A signal is also fed to the second timer switch 61 to cause the door 11 to stop exactly at the end of its closing stroke.

Figure 8:
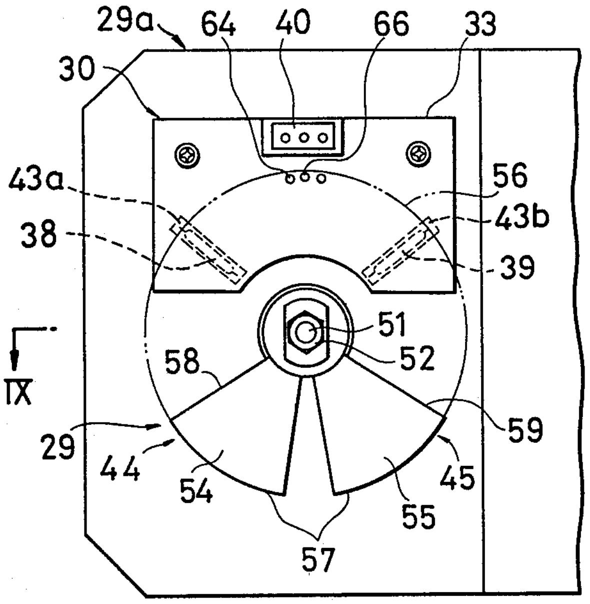
FIG. 8 is a front elevational view of a modified position sensing device.
Figure 9:
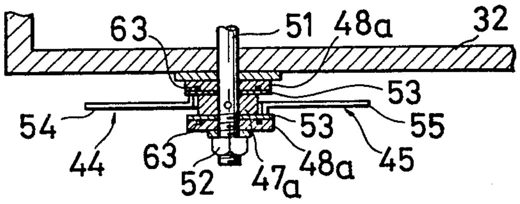
FIG. 9 is a cross-sectional view of the modified position sensing device taken along line IX—IX of FIG. 8.

According to a modified form of the invention shown in FIGS. 8 and 9, the retainer plates 48*a*,49*a* of the actuator unit 31 have a pair of annular rings 63,63 attached to their opposed surfaces, the annular rings 63,63 being made of a material of relatively high frictional resistance. The spacer member 47*a* is made of any suitable synthetic resin having a low coefficient of friction, and tightening of the nut 52 is such that the rings 63,63 are held in frictional engagement with the bases 53,53 of the magnetic shield members 44,45 so that the magnetic shield members 44,45 normally rotate with the drive shaft 51, but if the rotation of the magnetic shield members 44,45 is physically prevented, the drive shaft 51 continues to rotate or idles.

Figure 2C:
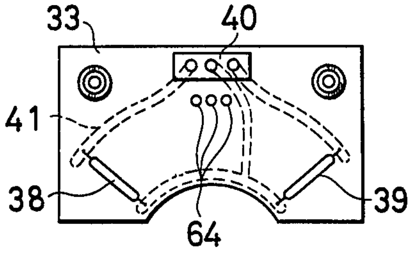
Figure 3A:
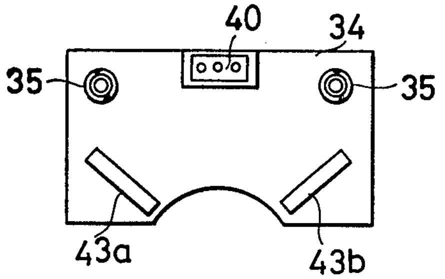
FIGS. 3A and 3B are front elevational views of a second plate member of the position sensing device.
Figure 3B:
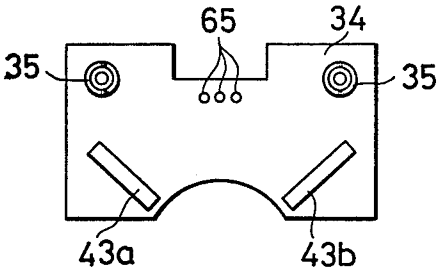

The first plate member 13 has three apertures 64 (FIG. 2C) formed therein and slightly spaced apart from one another, the apertures 64 being disposed slightly within the circle 56 (FIG. 8) when viewed in a direction perpendicular to the plane of the first plate member 33, and the intermediate aperture 64 being disposed in the aforesaid vertical central plane perpendicular to and centrally of the length of the first plate member 33. Similarly, the second plate member 34 (FIG. 3B) has three apertures 65 formed therein in alignment with their corresponding apertures 64. One or two of the three pairs of apertures 65,65 are selected according to the length of deceleration travel of the door 11 to be desired. In this embodiment, a stop member 66 in the form of a bar is supported in the intermediate apertures 64,65 in the first and second plate members 33,34 and extending therebetween as shown in FIG. 8.

With this construction, the position sensing device 29*a* can be readily adjusted when the apparatus according to the invention is to be installed on the automatic door assembly 10. The magnetic shield members 44,45 are first mounted on the drive shaft 51 such that there is a relatively large spacing between the sectors 54,55. Then, the door 11 is manually moved into its opened position to cause the sectors 54,55 to rotate in a counterclockwise direction. After the edge 59 of the sector 55 has been brought into abutting engagement with the stop member 66 to stop the rotating movement of the sector 55, the drive shaft 51 idles until the door 11 reaches the end of its opening stroke, thereby determining the radial position of the sector 55 with respect to the drive shaft 51.

Then, similarly, the door 11 is manually moved into its closed position to cause the sectors 54,55 to rotate in a clockwise direction. After the edge 58 of the sector 54 has been brought into abutting engagement with the stop member 66 to stop the turning movement of the sector 54, the drive shaft 51 idles until the door 11 reaches the end of its closing stroke, thereby determining the radial position of the sector 54 with respect to the drive shaft 51. If the edge 58 of the sector 54 stops short of the stop member 66 when the door 11 has moved to its fully closed position, then the sector 54 is further manually rotated to bring the edge 58 into abutting engagement with the stop member 66.

Since the magnetic shield members 44,45 need only to pass between the reed switches 38,39 and the magnets 43*a*,43*b* in order to sense the deceleration positions of the door 11, the position sensing device 29,29*a*, according to the invention ensures accurate and reliable operation of the automatic door 11. Further, by virtue of the provision of the magnetic shield members 44,45 mounted on the drive shaft 51, the position sensing device 29,29*a*, can be readily adjusted upon installation on the automatic door assembly 10 without regard to the length of travel of the door 11.

Although various minor modifications may be suggested by those versed in the art, it should be understood that we wish to embody within the scope of the patent warranted hereon, all such embodiments are reasonably and properly come within the scope of our contribution to the art.

What is claimed is:

1. Apparatus for automatically controlling the operation of a reciprocable door between its closed and opened positions comprising:
(a) an electric reversible motor connectable to a power source;
(b) a speed reducer operatively associated with said motor, said speed reducer having means for being operatively engaged to the door to drive the same;
(c) means for generating a driving signal;
(d) means for sensing the position of the door during its opening and closing strokes to generate a sensing signal, comprising:

(1) an actuator unit including
(i) a drive shaft coupled to an output shaft of said speed reducer, and
(ii) a magnetic shield means mounted on said drive shaft for angular movement therewith in either direction between a first and second position, said angular movement corresponding with the door stroke, and
(2) a signal generating unit including
(i) a pair of magnetic reed switches, and
(ii) a pair of permanent magnets arranged in spaced, operative, registered relationship to the respective reed switches, and
(3) said magnetic shield means being angularly movable in a plane intermediate the reed switches and the magnets and passing between the reed switches and magnets during door opening and closing strokes to prevent the magnetic field produced by the magnets from reaching said reed switches, thereby actuating the reed switches to generate said sensing signal;
(e) a motor control circuit connected to the power source, said circuit being responsive to said driving signal for driving the motor in a normal direction, and said circuit being responsive to said sensing signal to decelerate the motor to dampen the movement of the door;
(f) means responsive to said sensing signal to regulate said motor control circuit to deenergize said motor to stop the door at the ends of its opening and closing strokes; and
(g) means operative through said motor control circuit, for driving the motor in its reverse direction a prescribed length of time after the generation of said driving signal has been stopped.

2. Apparatus according to claim 1 in which said signal generating unit further includes a pair of first and second plate members arranged in parallel spaced relationship to each other, said reed switches being attached to said first plate member, said magnets being attached to said second plate member, said reed switches being angularly spaced equidistant from a plane perpendicular to and centrally of said first plate member, said magnets being spaced equidistantly from said plane and disposed in registry with said reed switches, and said drive shaft having its axis lying in said plane.

3. Apparatus according to claim 2 the longitudinal axis of each of said reed switches as well as the longitudinal axis of each of said magnets passing through the axis of said drive shaft.

4. Apparatus according to claim 2 in which said signal generating unit further includes a printed circuit formed on said first plate member and a connector mounted on said first plate member and connected to said printed circuit through which said reed switches are electrically connected to said motor control circuit, to said means for de-energizing the motor, and to said means for driving the motor in its reversing direction.

5. Apparatus according to claim 1 in which said magnetic shield means comprises a pair of plates each including a base in the form of a disc, a sector arranged in parallel relationship to said base, and a connecting portion interconnecting said base and said sector, the sectors being so offset toward each other from said bases as to lie in a common plane intermediate said first and second plate members, and said drive shaft passing through said bases.

6. Apparatus according to claim 5 in which said magnetic shield plates are mounted on and frictionally engaged with said drive shaft for angular movement normally therewith such that when said magnetic shield plates are physically prevented from movement with said drive shaft, said drive shaft nevertheless moves until the door reaches its stroke end.

7. Apparatus according to claim 5 in which said signal generating unit further includes a stop member extending between and supported by said first and second plate members, one of said sectors being engageable with said stop member when said magnetic shield means are moved to said first position, and the other sector being engageable with said stop member when said magnetic shield means are moved to said second position.

8. A door-position sensing device for use in a system which includes a driven speed reducer for moving the door between open and closed positions, said sensing device comprising:
(a) a base adapted to be fixedly supported with respect to the speed reducer;
(b) a shaft rotatably supported on said base and being adapted to be driven by the speed reducer at a rate less than that of the speed reducer, said shaft being rotatable for less than one revolution;
(c) means on said shaft representing the open position and the closed position of the door, said means comprising a magnetic shield means mounted on said shaft for angular movement therewith in either direction between said predetermined points in accordance with the door stroke;
(d) sensing means responsive to the arrival of said representing means at predetermined points for initiating a sensing for said system, said sensing means including a pair of magnetic reed switches and a pair of permanent magnets arranged in spaced, operative, registered relationship to the respective reed switches; and
(e) said magnetic shield means being angularly movable in a plane intermediate said reed switches and said magnets for rotating between said reed switches and said magnets during door movements to prevent the magnetic field produced by said magnets from reaching said reed switches, thereby activating said reed switches to generate said sensing signal.

9. A sensing device according to claim 8 further including: a pair of first and second plate members arranged in parallel spaced relationship to each other, said reed switches being attached to said first plate member, said magnets being attached to said second plate member, said reed switches being angularly spaced equidistantly from a plane perpendicular to and centrally of said first plate member, said magnets being spaced equidistantly from said plane and disposed in registry with said reed switches, and said shaft having its axis lying in said plane.

10. A sensing device according to claim 9, including: a printed circuit formed on said first plate member and a multiple circuit connector mounted on said first plate member and connected to said printed circuit through which said reed switches are electrically connected to the system.

11. A sensing device according to claim 8 the longitudinal axis of each of said reed switches as well as the longitudinal axis of each of said magnets passing through the axis of said shaft.

12. A sensing device according to claim 8, and said magnetic shield means comprising:

(a) a pair of plates each including a mounting base in the form of a disc;

(b) a sector arranged in parallel relationship to said mounting base; and (c) a connecting portion interconnecting said mounting base and said sector;

(d) the sectors being so offset toward each other from said mounting bases as to lie in a common plane intermediate said first and second plate members, and said shaft passing through said mounting bases.

13. A sensing device according to claim 12 in which said magnetic shield plates are mounted on and frictionally engaged with said shaft for angular movement normally therewith such that when said magnetic shield plates are physically prevented from movement with said shaft, said shaft nevertheless moves until the door reaches its ultimate position.

14. A sensing device according to claim 12, including: a stop member extending between and supported by said first and second plate members, one of said sectors being engageable with said stop member when said magnetic shield means are moved to one of said predetermined points, and the other sector being engageable with said stop member when said magnetic shield means are moved to the other of said predetermined points.

* * * * *